United States Patent
Wang et al.

(10) Patent No.: US 12,492,976 B2
(45) Date of Patent: Dec. 9, 2025

(54) BIAXIAL TEST DEVICE

(71) Applicant: East China Jiaotong University, Nanchang (CN)

(72) Inventors: Pei Wang, Nanchang (CN); Zhenyu Yin, Nanchang (CN); Changjie Xu, Nanchang (CN); Dehai Wang, Nanchang (CN); Wenbo Chen, Nanchang (CN); Daoyuan Tan, Nanchang (CN)

( * ) Notice: Subject to any disclaimer, the term of this patent is extended or adjusted under 35 U.S.C. 154(b) by 0 days.

(21) Appl. No.: 19/219,038

(22) Filed: May 27, 2025

(65) Prior Publication Data

US 2025/0283794 A1    Sep. 11, 2025

(30) Foreign Application Priority Data

Jul. 17, 2024 (CN) .......................... 202410955420.9

(51) Int. Cl.
*G01N 3/08* (2006.01)
*G01N 3/04* (2006.01)
*G01N 33/24* (2006.01)

(52) U.S. Cl.
CPC ................. *G01N 3/08* (2013.01); *G01N 3/04* (2013.01); *G01N 33/24* (2013.01);
(Continued)

(58) Field of Classification Search
CPC .... G01N 3/08; G01N 3/04; G01N 2203/0003; G01N 2203/0019; G01N 2203/0242; G01N 2203/0254; G01N 33/24
See application file for complete search history.

(56) References Cited

U.S. PATENT DOCUMENTS

2022/0236156 A1* 7/2022 Cai .................... G01N 15/0255

OTHER PUBLICATIONS

CNIPA Application No. 202410955420.9 First Office Action, issued Sep. 9, 2024, pp. 1-3, original Chinese.
(Continued)

*Primary Examiner* — Jonathan M Dunlap
(74) *Attorney, Agent, or Firm* — Addison D. Ault; IPGentleman Intellectual Property Services, LLC

(57) ABSTRACT

The invention discloses a biaxial test device, comprising: a bracket, a container, a sample setting assembly and a press, etc. Before use, the sample is installed between two limit plates. On the basis of applying confining pressure, the press is started, and the pressure rod moves vertically downward and applies a vertical downward load to the sample. When the sample is subjected to the vertical downward load, axial compression and radial deformation will occur. At this time, the radial deformation of the sample on both sides of the limit plates is limited, and expansion occurs on both sides without the limit plates. Subsequently, under the joint action of the confining pressure and the limit plates, the sample undergoes plane strain. Since the container and the limit plates are both in a transparent state, the side section state of the sample when plane strain occurs can be well observed. At the same time, the multiphase mixed fluid in the mixing container penetrates into the rock sample inside the sample and flows out through an output pipeline and is tested and analyzed by external equipment, so that the potential influence of multiphase seepage on the mechanical behavior of rock mass can be studied under plane strain conditions.

7 Claims, 4 Drawing Sheets

(52) U.S. Cl.
CPC ................ *G01N 2203/0003* (2013.01); *G01N 2203/0019* (2013.01); *G01N 2203/0242* (2013.01); *G01N 2203/0254* (2013.01)

(56) References Cited

OTHER PUBLICATIONS

CNIPA Application No. 202410955420.9 First Office Action, issued Sep. 9, 2024, pp. 1-3, English machine translation.

\* cited by examiner

BIAXIAL TEST DEVICE

CROSS-REFERENCE TO RELATED APPLICATION

This application claims priority to Chinese Patent Application No. 2024109554209, filed on Jul. 17, 2024 before the China National Intellectual Property Administration, the disclosure of which is incorporated herein by reference in entirety.

TECHNICAL FIELD

The invention relates to the technical field of geotechnical test equipment, in particular to a biaxial testing device.

BACKGROUND

In the field of geotechnical engineering, the change in the properties of rock under different engineering environments is a key consideration, which is crucial for the planning and safety of construction. Under various engineering conditions, rocks may experience various types of strains. In order to deeply understand these strains, it is necessary to simulate and measure the strain behavior of rocks in the laboratory. When the geological conditions are relatively homogeneous and the local three-dimensional effects have little impact on the overall extraction, the plane strain assumption can be used for theoretical analysis and numerical simulation. This assumption reduces the computational complexity of the problem and improves the analysis efficiency by simplifying the model, providing an effective theoretical tool for the preliminary design and evaluation of deep energy extraction projects.

However, in the process of deep oilfield development, complex seepage problems with the coexistence of multi-phase fluids such as oil, gas, and water are often encountered. Especially in the later stage of oilfield development, in order to improve the recovery rate, multiphase seepage is often induced by water injection or gas injection. Most existing rock mechanics test devices can only simulate triaxial compression tests under single-phase fluid seepage conditions, while test devices that can comprehensively test the influence of multiphase seepage are relatively rare, and the potential influence of multiphase seepage on the mechanical behavior of rock mass under plane strain conditions is often ignored.

SUMMARY

The purpose of the present invention is to overcome the problems in the prior art and provide a biaxial test device that can study the potential influence of multiphase seepage on the mechanical behavior of rock mass under plane strain conditions, thereby solving the technical problem that the prior art cannot reflect the actual stress state of rock in engineering.

The present invention provides a biaxial test device for testing a sample, wherein the sample includes a rubber membrane and a rock sample filled in the rubber membrane, the rubber membrane at the upper and lower ends of the sample is provided with openings, and each opening is connected with a water-permeable plate, comprising:

A bracket;

A container connected to the bracket and having a detachable top cover, wherein the top cover is provided with an exhaust hole, and the top cover is provided with a through hole, wherein the side wall of the container is made of a transparent material, the sample is located inside the container, and there is a gap between the inner side wall of the container and the sample;

Two limit plates are vertically connected to the inner bottom surface of the container, the two limit plates are parallel to each other, the limit plates are made of transparent material, a sample is placed between the two limit plates and the two limit plates are against two sides of the sample;

A press machine is connected to the bracket, and the press machine has a press rod, which can move in the vertical direction. The press rod passes through the through hole and is located in the container. The limit plates are located on both sides below the press rod. The press rod can move downward and abut against the top of the sample to apply a vertical load to the sample.

A mixing container containing a multi-phase mixed fluid;

The input pipeline has one end connected to the mixing container and the other end penetrates into the container and abuts against the water-permeable plate at the upper end of the sample;

The output pipeline has one end that penetrates the bottom of the container and contacts the water-permeable plate at the lower end of the sample, and the other end that passes through the container and communicates with the outside world;

The first pump body is arranged in the input pipeline and/or the output pipeline, and is used for allowing the multiphase mixed fluid in the mixing container to penetrate into the sample through the input pipeline.

Furthermore, it also includes:

Two mounting plates, one mounting plate corresponds to one limit plate, the two mounting plates are vertically and parallelly connected to the inner bottom surface of the container, and the two mounting plates are respectively located on both sides of the sample, and windows are opened on the mounting plates, and the limit plates are embedded in the windows;

The limit plate is made of high-strength glass material, and the mounting plate is made of metal material.

Furthermore, the side of the mounting plate facing the sample is flush with the side of the corresponding limit plate facing the sample.

Furthermore, it also includes: a plurality of fasteners, each fastener being detachably connected between the two mounting plates.

Furthermore, the fastener includes a connecting part and two fastening bolts. The connecting part is located between the two mounting plates. One fastening bolt corresponds to one mounting plate. Screw holes matching the fastening bolts are provided on the mounting plates and on both ends of the connecting part facing the two mounting plates. The fastening bolts are threadedly connected to the screw holes on the connecting part and the mounting plates at the same time.

Furthermore, a contact portion is connected to the top of the sample, and the contact portion has a horizontal third contact surface. The pressure rod is configured to abut against the third contact surface to apply a vertical load to the sample.

Furthermore, the lower part of the contact portion can move downward between two limit plates or mounting plates, and the lower part of the contact portion has two relative sliding surfaces, one sliding surface corresponds to a limit plate, the sliding surface is parallel to the corresponding limit plate, and the sliding surface can slide against the limit plate toward the side of the sample.

Furthermore, the container comprises:

A base having a horizontal upper surface, and two mounting plates are connected to the upper surface of the base;

A plurality of support parts, wherein the lower end of the support part is fixedly connected to the base, the upper end of the support part is detachably connected to the top cover, the plurality of support parts are evenly distributed on the circumference of the base, and the support parts are made of metal material;

The organic glass cover is in a vertical cylindrical structure with upper and lower openings. The lower end of the organic glass cover is connected to the upper surface of the base, and each supporting part is located inside the organic glass cover.

Furthermore, one end of the input pipeline located in the container penetrates into the contact portion and passes out from the lower end of the contact portion, thereby abutting against the upper end of the sample.

Compared with the prior art, the beneficial effects of the present invention are as follows: before use, the sample is installed between the two limit plates, and it is ensured that the limit plates on both sides are against the two sides of the sample, and the two side surfaces of the sample are completely covered and tightly fitted by the limit plates, a detachable top cover is installed, and a press is set up, the pressure rod passes vertically downward through the through hole into the container to press against the top of the sample, water is injected into the container, and on the basis of applying confining pressure, the press is started, the pressure rod moves vertically downward and applies a vertical downward load to the sample, the sample will be deformed when subjected to the load, and the deformation that should have collapsed downward and been extruded radially will be limited by the blocking and limiting action of the two limit plates. The lateral strain in one horizontal dimension is suppressed, and the deformation in the other horizontal dimension is amplified, thereby effectively reducing the ratio of the vertical deformation to the horizontal deformation, and presenting a good plane strain effect under the action of confining pressure. Since the container and the limit plate are both transparent, the side section state of the sample when plane strain occurs can be well observed. At the same time, the multiphase mixed fluid in the mixing container 6 penetrates into the rock sample inside the sample through the input pipe and the permeable plate, seeps out from the lower permeable plate, flows out through the output pipe, and is tested and analyzed by external equipment, so that the potential influence of multiphase seepage on the mechanical behavior of rock mass can be studied under plane strain conditions.

DESCRIPTION OF REFERENCE NUMERALS

Figure 1:
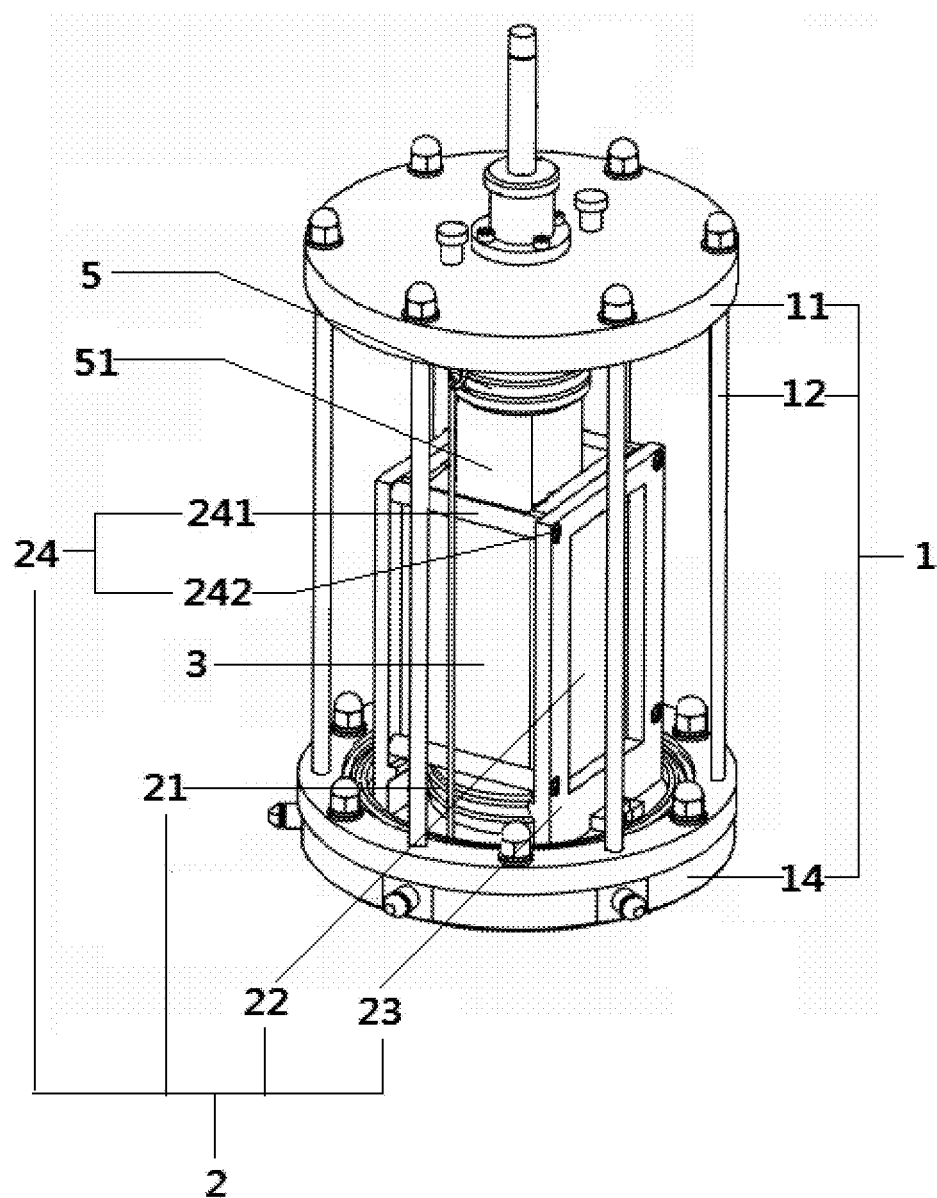
FIG. 1 is a schematic three-dimensional diagram of the main structure of an embodiment.

1. Container; 11. Top cover; 12. Support part; 13. Organic glass cover; 14. Base; 2. Sample setting assembly; 21. Sample mounting seat; 22. Limit plate; 23. Mounting plate; 24. Fastener; 241. Connecting part; 242. Fastening bolt; 3. Sample; 4. Pressure rod; 5. Contact part; 51. Sliding surface; 6. Mixing container.

DETAILED DESCRIPTION OF EMBODIMENTS

The specific implementation of the present invention is described in detail below, but it should be understood that the protection scope of the present invention is not limited by the specific implementation. Based on the embodiments of the present invention, all other embodiments obtained by ordinary technicians in this field without creative work are within the scope of protection of the present invention.

The present invention provides a biaxial test device for conducting an experiment on a sample 3, wherein the sample 3 includes a rubber membrane and a rock sample filled in the rubber membrane, the rubber membranes at the upper and lower ends of the sample are provided with openings, each opening being connected to a water-permeable plate, and comprising: a bracket, a container 1, a sample setting assembly 2, a press, etc., wherein the container 1 is connected to the bracket and has a detachable top cover 11, the top cover 11 is provided with an exhaust hole, and the top cover 11 is provided with a through hole, the side wall of the container 1 is made of a transparent material, the sample 3 is located inside the container 1, and there is a gap between the inner side wall of the container 1 and the sample 3; the sample setting assembly 2 comprises: a sample mounting seat 21 and two limit plates 22, the sample mounting seat 21 is fixedly connected to the inner bottom surface of the container 1 and is located below the through hole, the sample mounting seat 21 is used to place the sample 3, and there is a gap between the inner side wall of the container and the sample; the two limit plates 22 are vertically connected to the inner bottom surface of the container 1, and the two limit plates 22 are parallel to each other, the limit plates 22 are made of transparent material, a sample 3 is placed between the two limit plates 22 and the two limit plates 22 are against the two sides of the sample 3; the press is connected to the bracket, the press has a pressure rod 4, the pressure rod 4 can move in the vertical direction, the pressure rod 4 passes through the through hole and is located in the container 1, the limit plates 22 are located on both sides below the pressure rod 4, the pressure rod 4 can move downward and against the top of the sample 3 to apply a vertical load to the sample 3; a mixing container 6, wherein a multi-phase mixed fluid is contained; an input pipeline, one end of which is connected to the mixing container 6, and the other end penetrates into the container and against the permeable plate at the upper end of the sample 3; an output pipeline, one end of which penetrates into the bottom of the container and against the permeable plate at the lower end of the sample 3, and the other end passes through the container 1 and is connected to the outside; a first pump body, which is arranged in the input pipeline and the output pipeline, and is used to infiltrate the multi-phase mixed fluid in the mixing container 6 into the sample 3 through the input pipeline.

Figure 2:
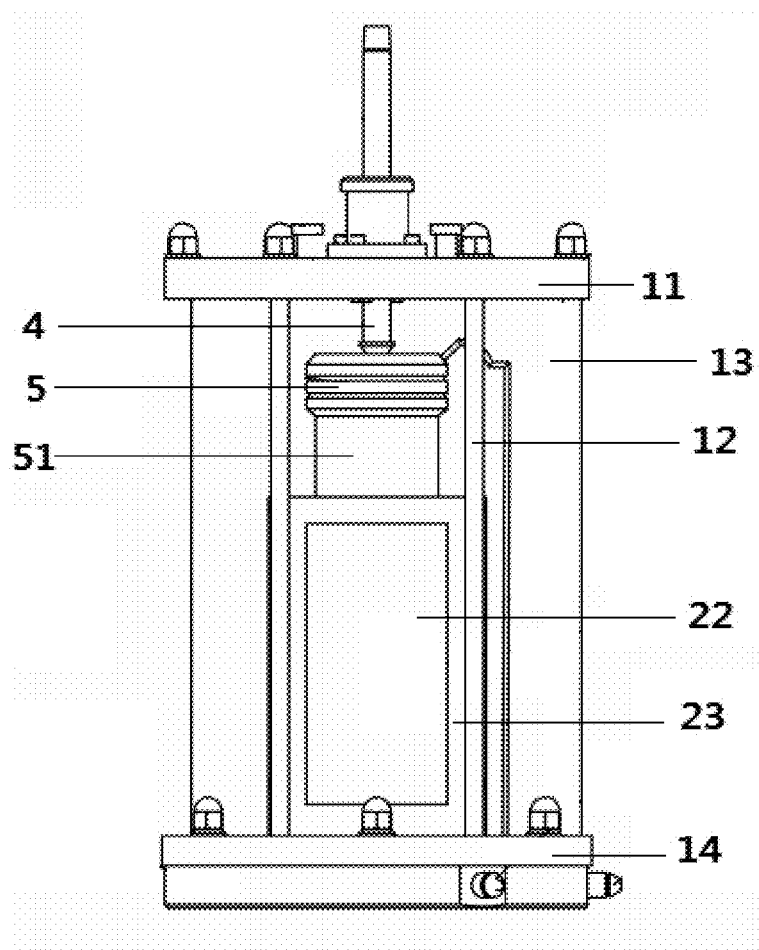
FIG. 2 is a schematic front view of the main structure of an embodiment.
Figure 3:
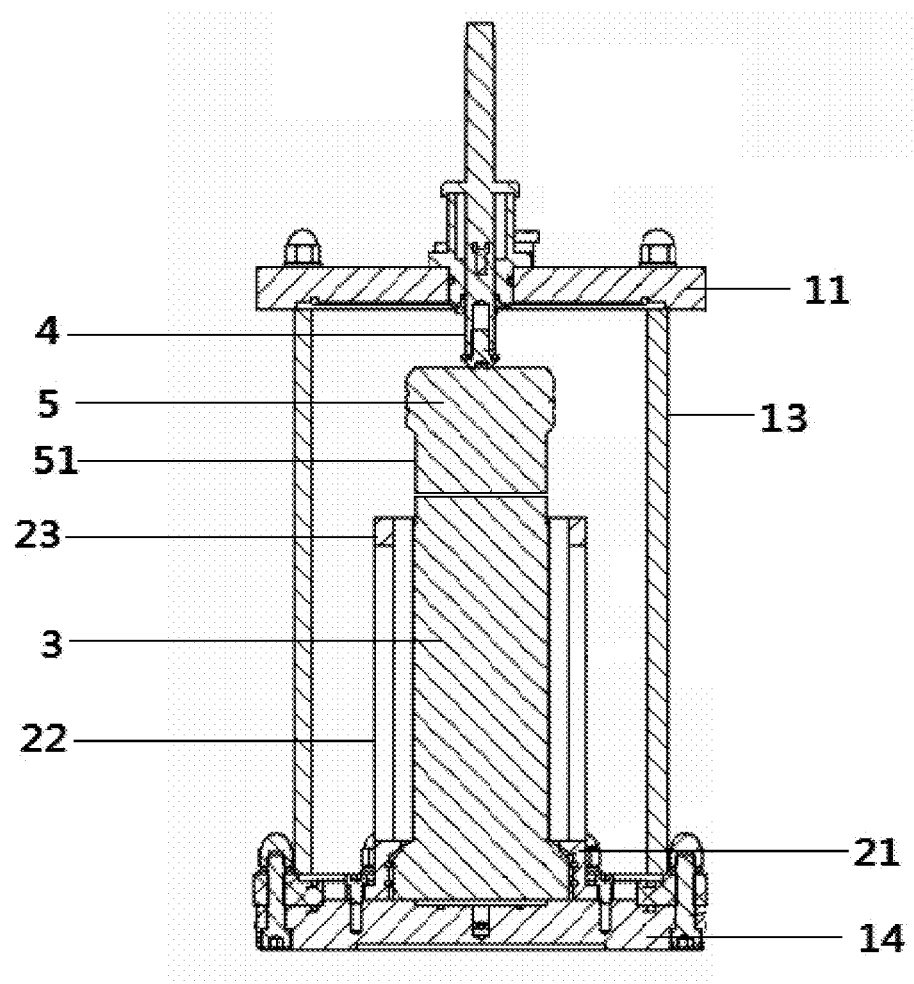
FIG. 3 is a side cross-sectional view of the main structure of an embodiment.
Figure 4:
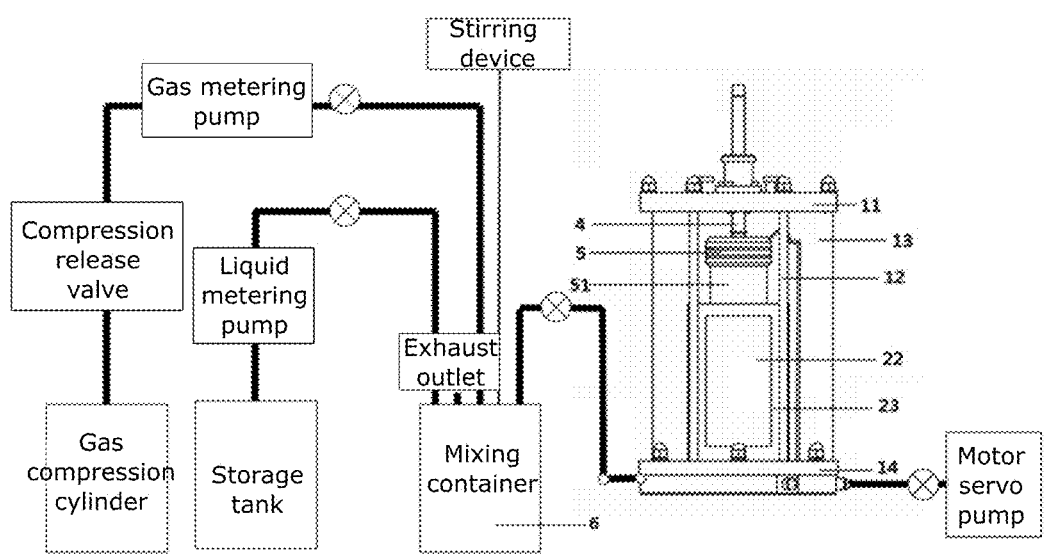
FIG. 4 is a side view showing the overall structural connection relationship of an embodiment.

Specifically, please refer to FIGS. 1 to 4. Before use, the sample 3 is installed between the two limit plates 22. The sample mounting seat 21 in conventional technology can be used to detachably connect the bottom of the sample 3, and ensure that the limit plates 22 on both sides are against the two sides of the sample 3, and the two side surfaces of the sample 3 are completely covered and tightly fitted by the limit plates 22. Install a detachable top cover 11, and set up a press. The pressure rod 4 is vertically downward through the through hole into the container 1 to resist the top of the sample 3. Then, an external water injection system can be used to inject water into the container 1 through the water injection pipeline. After the water in the container 1 submerges the sample 3, a confining pressure will be generated on the sample 3. Start the press, and the pressure rod 4 moves vertically downward and applies a vertical downward load to the sample 3. When the sample 3 is subjected to the vertical load, axial compression and radial deformation will occur. At this time, the radial deformation of the sample 3 on both sides of the limit plate 22 is suppressed, and expansion occurs on both sides without the limit plate 22. Subsequently, under the combined action of the confining pressure and the limit plate 22, the sample undergoes plane strain. Since the container 1 and the limit plate 22 are both transparent, the side section state of the sample when plane strain occurs can be well observed. At the same time, the multiphase mixed fluid in the mixing container 6 infiltrates into the rock sample inside the sample 3 through the input pipe and the permeable plate, seeps out from the lower permeable plate, flows out through the output pipe, and is tested and analyzed by external equipment, so that the potential influence of multiphase seepage on the mechanical behavior of the rock mass can be studied under plane strain conditions.

In this embodiment, the mixing container 6 contains a liquid-gas two-phase mixed fluid, and in other embodiments, the mixing container 6 can contain an oil-gas two-phase mixed fluid, an oil-liquid-gas three-phase mixed fluid or other types of multiphase mixed fluids.

In this embodiment, the mixing container 6 is connected to a gas compression bottle and a liquid storage tank, and conventional valves and various pump bodies are provided at the connection to supply liquid and gas into the mixing container 6 to form a multiphase mixed fluid.

In some embodiments, a stirring element is provided in the mixing container 6 to assist in forming a multiphase mixed fluid.

In this embodiment, the end of the output pipeline connected to the outside is connected to a motor servo pump, and the data of the sample under the coupling of plane strain and multiphase seepage is obtained by detecting the liquid flowing out of the sample 3 for subsequent analysis. In other embodiments, other conventional equipment can also be used to analyze different parameters of the liquid flowing out of the sample 3.

In this embodiment, in order to ensure that the limit plate 22 can exert a good technical effect, the sample 3 has a rectangular shape, and the sample 3 has two side surfaces parallel to the limit plate 22, one side surface is against a limit plate 22, and the area of the side surface of the limit plate 22 facing the sample 3 is larger than the side surface area of the sample 3.

In various embodiments, after the sample 3 is presented in a plane strain state, various parameter tests can be performed on the sample 3 according to different research needs. The equipment used for the test is all existing technology, such as pressure sensors, displacement meters, volume change displays, etc., which can be set on the present invention and/or the sample 3 in any way that can be thought of by those skilled in the art, so as to obtain the required parameter data and complete various studies on the properties of the rock (sample 3) under the plane strain state.

For example, in this embodiment, it is necessary to conduct experiments and measurements on the sample 3 under the plane strain state. In this experiment, the confining pressure of the sample 3 needs to be controlled. Therefore, the container 1 in this embodiment is provided with a confining pressure loading device in conventional technology. Through a liquid medium such as water or oil, pressure is applied from a pressure source to the liquid medium through the confining pressure loading device. The pressure is uniformly transmitted to the surrounding of the sample 3 through the liquid medium, thereby applying confining pressure to the sample 3. At the same time, a computer control system is used for monitoring and adjustment. Conventional technical means also have a pressure control panel for controlling and observing the confining pressure value. The confining pressure loading device in this embodiment adopts the principle of airless water injection in conventional technical means to increase the confining pressure of the sample 3 in water. In other embodiments, mechanical or other confining pressure loading devices that can be thought of by people in this field can also be used.

Furthermore, considering that during the loading process of the press, as the sample 3 deforms, a gradually increasing pressure will be applied to the two limit plates 22, in order to ensure the limiting effect of the limit plates 22, they should have a stronger connection with the container 1, but common transparent materials often do not have good strength and connection performance, so the sample setting component 2 also includes:

Two mounting plates 23, one mounting plate 23 corresponds to one limit plate 22, the two mounting plates 23 are vertically and parallelly connected to the inner bottom surface of the container 1, and the two mounting plates 23 are respectively located on both sides of the sample 3 and the sample mounting seat 21, and a window is opened on the mounting plate 23, and the limit plate 22 is embedded in the window;

The limit plate 22 is made of high-strength glass material, and the mounting plate 23 is made of metal material.

Furthermore, after using the mounting plate 23 to connect the limit plate 22 and the container 1, it is considered that part of the specimen 3 will be against the mounting plate 23 when deformed. In order to ensure that the side of the specimen 3 facing the mounting plate 23/limit plate 22 remains flat during deformation, so as to avoid the influence of the plane strain process on the specimen 3, in particular, the side of the mounting plate 23 facing the specimen 3 is flush with the side of the corresponding limit plate 22 facing the specimen.

Furthermore, when the sample 3 is deformed by the load, its two side surfaces will press against the mounting plate 23/limit plate 22 and generate a large normal load on the mounting plate 23/limit plate 22. To ensure the limiting effect of the limit plate 22 on the deformation of the sample 3, the sample setting assembly 2 also includes: a plurality of fasteners 24, each fastener 24 is detachably connected between the two mounting plates 23, thereby ensuring that even under the action of load, the two mounting plates 23/limit plates 22 still maintain a stable parallel relationship and the spacing remains unchanged.

Furthermore, considering that it is necessary to increase the stability of the positional relationship between the two mounting plates 23/limit plates 22 without affecting the sample 3, and the fastener 24 between the two mounting plates 23/limit plates 22 will have the problem of blocking the installation path of the sample 3, it is necessary to provide a detachable connection method of the fastener 24. In this embodiment, the fastener 24 includes a connecting portion 241 and two fastening bolts 242. The connecting portion 241 is located between the two mounting plates 23, and one fastening bolt 242 corresponds to one mounting plate 23. Screw holes matching the fastening bolts 242 are provided on the mounting plate 23 and on both ends of the connecting portion 241 facing the two mounting plates 23. The fastening bolts 242 are threadedly connected to the connecting portion 241 and the screw holes on the mounting plate 23.

In the above setting, each connecting part 241 is a rod body parallel to each other, which can be detachably connected between the two mounting plates 23 by fastening bolts 242. The above setting of the connecting part 241 is adapted to resist the normal load applied between the mounting plate 23/limit plate 22 for the deformation specimen 3, and can well maintain the parallel relationship and spacing between the two mounting plates 23/limit plates 22.

Furthermore, during the deformation of the sample 3, even if the pressure rod 4 maintains a vertical downward loading movement direction, as the sample 3 deforms, the end of the sample 3 that abuts against the pressure rod 4 may bend/tilt/collapse, etc., causing the axial direction of the sample 3 to deviate, and then the load of the pressure rod 4 is not parallel to the axial direction of the sample 3, affecting the plane strain process of the sample 3. In order to ensure that the axial direction of the sample 3 is consistent with the loading direction of the pressure rod 4, a contact portion 5 is connected to the top of the sample 3, and the contact portion 5 has a horizontal third contact surface. The pressure rod 4 is configured to abut against the third contact surface to apply a vertical load to the sample 3.

Furthermore, considering that as the sample 3 is deformed, the contact portion 5 will sink along with the top of the sample 3, in order to make the contact portion 5 adapt to the two limit plates 22/mounting plates 23 and avoid interference between the structures, the lower portion of the contact portion 5 can move downward into between the two limit plates 22 or the mounting plates 23, and the lower portion of the contact portion 5 has two relative sliding surfaces 51, one sliding surface 51 corresponds to a limit plate 22, the sliding surface 51 is parallel to the corresponding limit plate 22, and the sliding surface 51 can slide against the limit plate 22 toward the side of the sample 3.

Furthermore, the container 1 includes: a base 14, the base 14 has a horizontal upper surface, the sample mounting seat 21 and the two mounting plates 23 are connected to the upper surface of the base 14; a plurality of support parts 12, the lower end of the support part 12 is fixedly connected to the base 14, the upper end of the support part 12 is detachably connected to the top cover 11, the plurality of support parts 12 are evenly distributed on the circumference of the base 14, and the support part 12 is made of metal material; an organic glass cover 13, which is a vertical cylindrical structure and is opened at the top and bottom, the lower end of the organic glass cover 13 is connected to the upper surface of the base 14, and each support part is located inside the organic glass cover 13.

Furthermore, one end of the input pipeline located in the container 1 penetrates into the contact portion and passes out from the lower end of the contact portion, thereby abutting against the upper end of the sample 3.

Although embodiments of the present invention have been shown and described, it will be appreciated by those skilled in the art that various changes, modifications, substitutions and variations can be made to the embodiments without departing from the principles and spirit of the present invention, and the scope of the present invention is defined by the appended claims and their equivalents.

What is claimed is:

1. A biaxial testing device, characterized in that it is used to conduct an experiment on a sample (3), wherein the sample (3) comprises a rock sample inside of a rubber membrane, wherein the rubber membrane is provided with openings at the upper and lower ends of the sample, and each opening is connected to a water-permeable plate, wherein the biaxial testing device comprises:

a bracket;

a container (1) connected to a support comprising a detachable top cover (11); wherein the top cover (11) is provided with an exhaust hole and a through hole; the side wall of the container (1) is made of a transparent material; the sample (3) can be positioned inside the container (1); and there is a gap between the inner side wall of the container (1) and the sample (3);

wherein two limit plates (22) are vertically connected to the inner bottom surface of the container (1); the two limit plates (22) are parallel to each other; the limit plates (22) are made of a transparent material; a sample (3) can be placed between the two limit plates (22) and the two limit plates (22) are against two sides of the sample (3); and a press machine connected to the support, wherein the press machine comprises a press rod (4), wherein the press rod (4) is able to move in a vertical direction, the press rod (4) passes through a through hole and being located in the container (1), the limit plates (22) are located on both sides below the press rod (4), the press rod (4) is able to move downward and abut against the top of the sample (3) so as to apply a vertical load to the sample (3);

a mixing container (6) containing a multi-phase mixed fluid;

an input pipeline, one end of which is connected to the mixing container (6), and the other end of which penetrates into the interior of the container (1) and abuts against a water-permeable plate at the upper end of the sample (3);

wherein, the output pipe has one end that penetrates into the bottom of the container and contacts the water-permeable plate at the lower end of the sample (3), and the other end that passes out of the container and communicates with the outside world; and wherein a first pump body is arranged in the input pipeline and/or the output pipeline, and is used to allow the multiphase mixed fluid in the mixing container (6) to penetrate into the sample (3) through the input pipeline and then flow out from the output pipeline, wherein the biaxial testing device also includes: two mounting plates (23), wherein one mounting plate (23) corresponds to one limit plate (22), the two mounting plates (23) being vertically connected to the inner bottom surface of the container (1) and parallel to each other, wherein the two mounting plates (23) are respectively located on two sides of the sample (3), wherein the mounting plates (23) are provided with windows, and wherein the limit plates (22) are embedded in the windows;

wherein the limit plate (22) is made of high-strength glass material, and the mounting plate (23) is made of metal material;

wherein the side of the mounting plate (23) facing the specimen (3) is flush with the side of the corresponding limit plate (22) facing the specimen.

2. The biaxial testing device according to claim 1, characterized in that it further comprises: a plurality of fasteners (24), each fastener (24) being detachably connected between the two mounting plates (23).

3. The biaxial testing device according to claim 2, characterized in that the fastener (24) includes a connecting portion (241) and two fastening bolts (242), wherein the connecting portion (241) is located between the two mounting plates (23), wherein one fastening bolt (242) corresponds to one mounting plate (23), screw holes matching the fastening bolts (242) are provided on the mounting plates (23) and on both ends of the connecting portion (241) facing the two mounting plates (23), and wherein the fastening bolts (242) are threadedly connected to the screw holes on the connecting portion (241) and the mounting plates (23) at the same time.

4. The biaxial testing device according to claim 3, characterized in that a contact portion (5) is connected to the top of the specimen (3), wherein the contact portion (5) has a horizontal third contact surface, and the pressure rod (4) is configured to abut against the third contact surface to apply a vertical load to the specimen (3).

5. The biaxial testing device according to claim 4, characterized in that the lower part of the contact portion (5) can move downward into between two limit plates (22) or mounting plates (23), and the lower part of the contact portion (5) has two opposing sliding surfaces (51), one sliding surface (51) corresponds to a limit plate (22), the sliding surface (51) is parallel to the corresponding limit plate (22), and the sliding surface (51) can slide against the limit plate (22) toward the side of the specimen (3).

6. The biaxial testing device according to claim 5, characterized in that the container (1) comprises:
- a base (14), the base (14) having a horizontal upper surface, wherein the two mounting plates (23) are both connected to the upper surface of the base (14);
- a plurality of support portions (12), wherein the lower ends of the support portions (12) are fixedly connected to the base (14), the upper ends of the support portions (12) are detachably connected to the top cover (11), the plurality of support portions (12) are evenly distributed around the circumference of the base (14), and the support portions (12) are made of a metal material;
- wherein, the organic glass cover (13) is in the form of a vertical cylindrical structure with upper and lower openings, and wherein the lower end of the organic glass cover (13) is connected to the upper surface of the base (14), and each supporting part is located inside the organic glass cover (13).

7. The biaxial testing device according to claim 6, characterized in that one end of the input pipe located in the container (1) penetrates into the contact portion and exits from the lower end of the contact portion, thereby abutting against the upper end of the specimen (3).

* * * * *